United States Patent [19]

Virgil et al.

[11] Patent Number: 5,457,792
[45] Date of Patent: Oct. 10, 1995

[54] SYSTEM FOR USING TASK TABLES AND TECHNICAL DATA FROM A RELATIONAL DATABASE TO PRODUCE A PARSED FILE OF FORMAT INSTRUCTION AND A STANDARDIZED DOCUMENT

[75] Inventors: Kenneth W. Virgil; Albert D. Baron; Philip J. June, all of Tucson, Ariz.

[73] Assignee: Hughes Aircraft Company, Los Angeles, Calif.

[21] Appl. No.: 788,906

[22] Filed: Nov. 7, 1991

[51] Int. Cl.⁶ .................................................. G06F 17/30
[52] U.S. Cl. .............. 395/600; 364/419.14; 364/DIG. 1; 364/282.1; 364/238.4
[58] Field of Search .............................. 364/419, 419.03, 364/419.1, 419.17, 419.14; 395/600, 650

[56] References Cited

U.S. PATENT DOCUMENTS

| | | | |
|---|---|---|---|
| 5,144,555 | 9/1992 | Takadachi et al. | 364/419 |
| 5,148,366 | 9/1992 | Buchanan et al. | 364/419.14 |
| 5,187,162 | 1/1993 | Smith et al. | 364/419 |
| 5,202,977 | 4/1993 | Pasetes, Jr. et al. | 395/500 |
| 5,267,155 | 11/1993 | Buchanan et al. | 364/419.14 |
| 5,280,574 | 1/1994 | Mizuta et al. | 395/146 |
| 5,307,266 | 4/1994 | Hayashi et al. | 364/419.07 |
| 5,361,199 | 11/1994 | Shoquist et al. | 364/401 |

*Primary Examiner*—Thomas G. Black
*Assistant Examiner*—Wayne Amsbury
*Attorney, Agent, or Firm*—Georgann S. Grunebach; Wanda K. Denson-Low

[57] ABSTRACT

A process for extracting data from a MIL-STD relational database, parsing and automatically processing the resultant output into a MIL-STD technical publication. The data extracted from the database is tagged, sorted and passed to a Parser program which produces several outputs. One output is a disk file which has encoded tags and control characters. The disk file is then processed into word processing syntax used in MIL-STD publications. Another output is a formatted pseudo technical publication which contains all relevant data in a style which resembles a technical manual. This pseudo technical publication allows the data to be reviewed and approved prior to processing the disk file data into a technical publication. A third output is a Task checklist.

26 Claims, 11 Drawing Sheets

| CHAPTER001 | WING REPAIR AND REPLACEMENT |
|---|---|
| PROCESS001 | R/R QUICK RELEASE PIN |
| AE | AHGHHGAC R/R QUICK RELEASE PIN |

FIG. 4.

SAMPLE CHAPTER HEADER RECORD

CHAPTER 001    WING REPAIR AND REPLACEMENT

Keyword must be in cols 1-7
Chapter number cols 8-10
Chapter title cols 23-58

FIG. 5.

SAMPLE PROCESS HEADER RECORD

PROCESS 001    R/R QUICK RELEASE PIN

Keyword must be in cols 1-7
Process number cols 8-10
Process title cols 23-58

SYSTEM FOR USING TASK TABLES AND TECHNICAL DATA FROM A RELATIONAL DATABASE TO PRODUCE A PARSED FILE OF FORMAT INSTRUCTION AND A STANDARDIZED DOCUMENT

BACKGROUND OF THE INVENTION

The present invention relates to the generation of technical publications which meet particular format requirements by means of an automated process and, more particularly, to a process for extracting data from a MIL-STD relational database, parsing the data and automatically processing the resultant output into a MIL-STD technical publication. "MIL-STD" is an abbreviation for "Military Standard." The Department of Defense (DoD) publishes Military Standards as a means of standardizing the way, means, and manner of doing business. When doing business with DoD, any MIL-STDs referring to that type of business must be adhered to.

The U.S. government has established a relational database containing information relating to various military logistical matters. This is known as the MIL-STD-1388-2A Logistical Support Analysis Record (LSAR) database. MIL-STD-1388-2A establishes a standard medium to systematically record, store, process and report data gathered during the logistics and engineering front-end analysis process. This data is required by the elements of support to develop their logistics supportability products. The MIL-STD defines a file format which permits orderly and cost-effective input, storage, analysis, and retrieval of logistical support analysis (LSA) data and LSA-related information.

Vendors who wish to provide computer tracking of their products are required to comply with MIL-STD-1388-2A in the construction of their databases. Conventionally, these databases have been used as repositories for engineering notes for particular products and services. Thus, for example, a vendor of an airborne missile may provide a database in which are stored various engineering notes regarding the maintenance, installation and removal procedures for handling and maintaining the missile.

The U.S. government typically requires vendors to provide standard technical publications and other logistic documents in support of Department of Defense products, including Technical Publications, Technical Manuals and the like. Such documents are typically required to comply with particular military standards, such as MIL-M-38784 and MIL-M-81927. MIL-M-38784 is the most commonly used general style and format requirement for preparation of manuscripts and reproducible copy for standard technical manuals and changes thereto. MIL-M-81927 is the general style and format requirement for the preparation of technical manuals to the Work Package (WP) concept. The WP manual is specifically designed to respond to work tasks, i.e., the complete set of instructions and pertinent information for a given work task is assembled into a single stand-alone work package. The useability of a WP is the result of applying logical organization to improve access to technical information.

In the past, these technical publication documents have been produced by technical writers who specialize in a particular technical field. Not only is this costly because of the need to create similar redundant data from one set of engineering data, but it can result in great difficulty in updating Logistical Outputs, for example, in the case of a technical manual, wherein these outputs include LSA reports, training information, Level of Repair Analysis (LORA) information (i.e., information regarding the justification of the decision to repair or discard a failed item of hardware for each anticipated maintenance action on that item), and the like when engineering of the product has changed and causes discrepancies between the information contained in the various outputs. The vendor's LSAR database was typically used to provide printouts of the technical notes stored therein pertaining to a particular product, which printouts were given to the technical writers. The writers would then have to verify the data set forth in the notes, and rewrite the notes into complete sentences prior to creating the technical document. The document must then be edited for completeness and accuracy before creating a camera ready document.

It is therefore an object of the present invention to provide a method for automatically generating a technical publication which complies with a prescribed format such as a military specification from data stored in a database.

SUMMARY OF THE INVENTION

In a general sense, the invention is embodied in a method for automatically generating a technical publication descriptive of a task or series of tasks and complying with a predetermined standardized document format. The method includes the following steps:

for each task, storing a data set in a database which describes said task, the data being identified with a predetermined unique identification name;

constructing a task table which contains a list of data sets, the task table for identifying the data to be extracted from the database for a particular chapter of the document to be generated, the task table comprising a listing of the identification names of the data sets to be extracted from the data base;

using the task table to extract the data sets from the database;

parsing the extracted data sets to create a file containing the data necessary to publish the technical publication; and using the file to publish the technical publication.

In a preferred embodiment, the task table comprises a chapter header record which defines the chapter number and name, a process header record which assigns beginning paragraph numbers within a chapter, and at least one task identifier record which identifies which data sets are to be extracted from the database.

The method has utility for generating military standard technical publications from a MIL-STD relational database.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figures 1, 2:
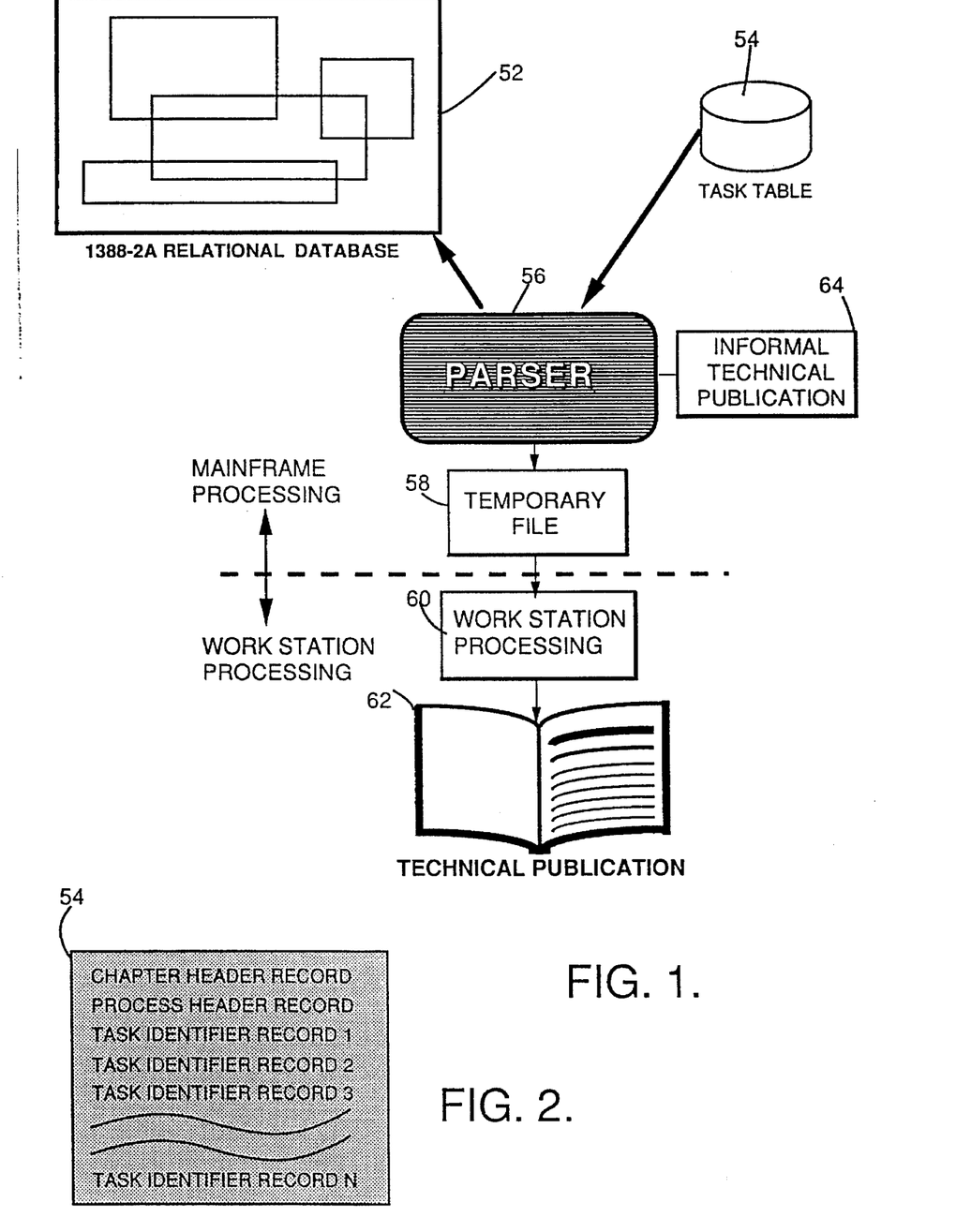
FIG. 1 is a simplified operational flow diagram illustrative of a preferred embodiment of a method for creating automated publications in accordance with the invention.
FIG. 2 illustrates the general format of a task table employed in the method of FIG. 1.

FIG. 1 illustrates a simplified operational flow diagram illustrative of a preferred embodiment of a method for creating automated publications in accordance with the invention. In this embodiment, programs written in the Common Business Oriented Language (COBOL) are used to extract selected data from the LSAR relational database 52, which is structured in accordance with MIL-STD 1388-2A guidelines. Access to the data is accomplished via Structured Query Language (SQL) calls imbedded in the COBOL program logic. In this embodiment, a responsible support engineer prepares the data to be stored in the database which describes a particular task sufficiently to comply with the applicable MIL-STD for the technical publication to be generated. The data for a particular task are identified by an identification name or symbol, permitting the data to be extracted by use of the identification name.

The technical publication to be generated is defined by a task table 54. In this embodiment, the task table is generated by the responsible support engineer, and comprises a series of records, described more fully below, which identify the data to be extracted from the database 52 for a given task or series of tasks.

Extracted data is tagged, sorted and passed to another COBOL program, hereinafter described as the Parser program 56. In this embodiment, the Parser 56 produces two distinct outputs. The first output is a disk file 58 which has encoded tags and control characters. All the processing thus far described takes place within a mainframe processing environment. The disk file 58 is passed to a personal computer workstation. Program macros are used in the workstation processing 60 to convert the encoded tags and control characters into word processing syntax used in MIL-STD publications, thereby generating the desired technical publication 62.

The second output of the Parser program 56 is a formatted pseudo technical publication 64 which contains all relevant data in a style which resembles a technical manual. This publication allows the data to be reviewed and approved prior to sending the disk file 58 to the workstation processing 60.

In this embodiment, the task tables which define the data to be extracted by the Parser 56 each comprise two header records and a variable number of task identifier records. Thus, each table comprises a chapter header record, a process header record, and N task identifier records. FIG. 2 illustrates the general format of a task table 54.

The first header record of a task table is the chapter header record, and defines the chapter number and name. Only one chapter header record may be used in a task table and it must be the first record in the table. Each chapter header record follows the same format, wherein columns 1–7, i.e., the first seven positions, are reserved for the CHAPTER keyword. Columns 8–10 are reserved as a three position field which designates the chapter number to be assigned to the chapter. This field is optional, in that the Parser program will assign a default value of 001 to this field if it is blank. If the field is used, it is zero filled to make it numeric, e.g., 004 represents the value four. Columns 11–22 are not used. Columns 23–58 are reserved for the name of the chapter exactly as it will appear in the Parser printouts of the document. This field is optional, and may be left blank. Columns 59–80 are not used.

Figure 3:
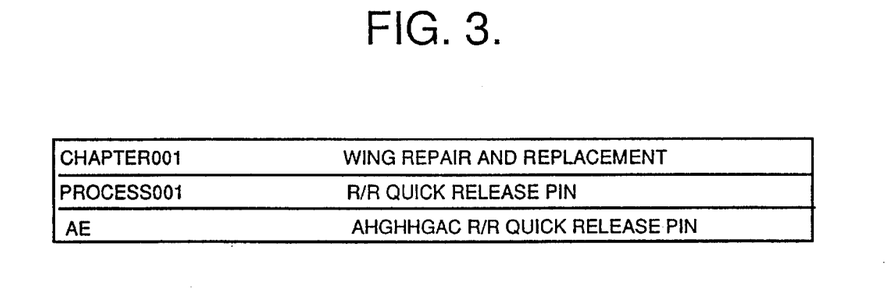
FIG. 3 illustrates an exemplary task table.
Figure 4:
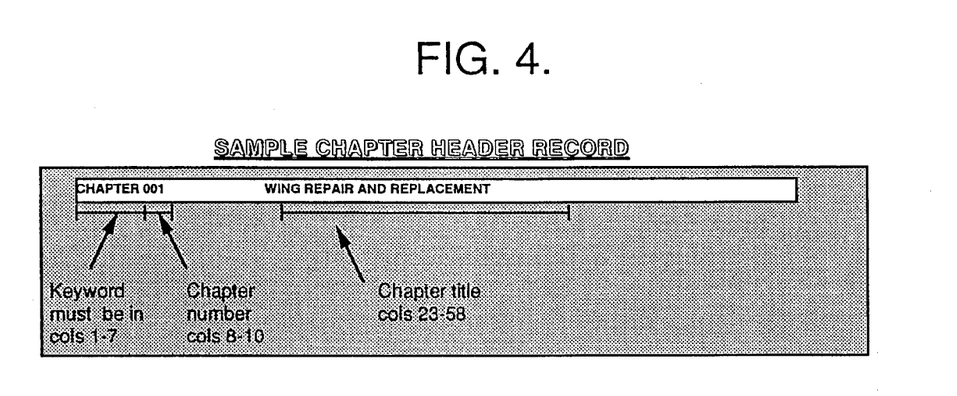
FIG. 4 illustrates the chapter header record of the task table of FIG. 3 is further detail.

FIG. 3 illustrates an exemplary task table, with the chapter header record being the first record thereof. FIG. 4 shows the chapter header record of this task table in further detail.

The second header record is the process header record and is used to assign beginning paragraph numbers. This record is mandatory, and can be used to break a chapter into subchapters. Each process header record follows the same format, wherein the first seven positions, columns 1–7, are reserved for a keyword. Columns 8–10 are reserved for a three position field which designates the starting paragraph number for the tasks in the task table. This field is optional in that the Parser program will assign a default value of 001 if this field is blank. The Parser program automatically increases the process number by one for each subsequent task identifier record. The Task Identifier Record is used to identify which tasks the Parser programs extract from the database. These records are processed in the order they appear in the table. Columns 11–22 are not used. Columns 23–58 are reserved for a process title; this is an optional field which is used to describe the overall scope of the tasks in the task table. Its purpose is to assign a meaningful label to the tasks and will not be printed in the Parser reports, which include the Task Checklist and the pseudo Technical Manual. Columns 59–80 are not used.

Figure 5:
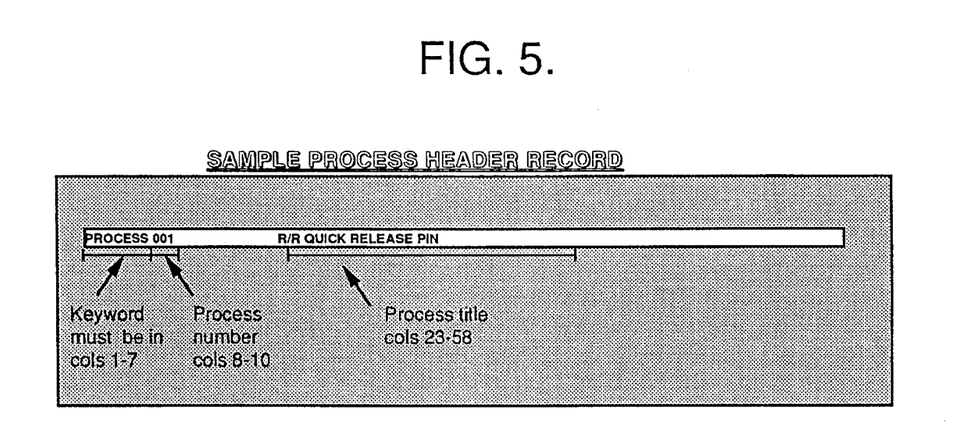
FIG. 5 illustrates the process header record of the task table of FIG. 3 in further detail.

FIG. 5 illustrates the process header record of the task table of FIG. 3 in further detail.

Figure 6:
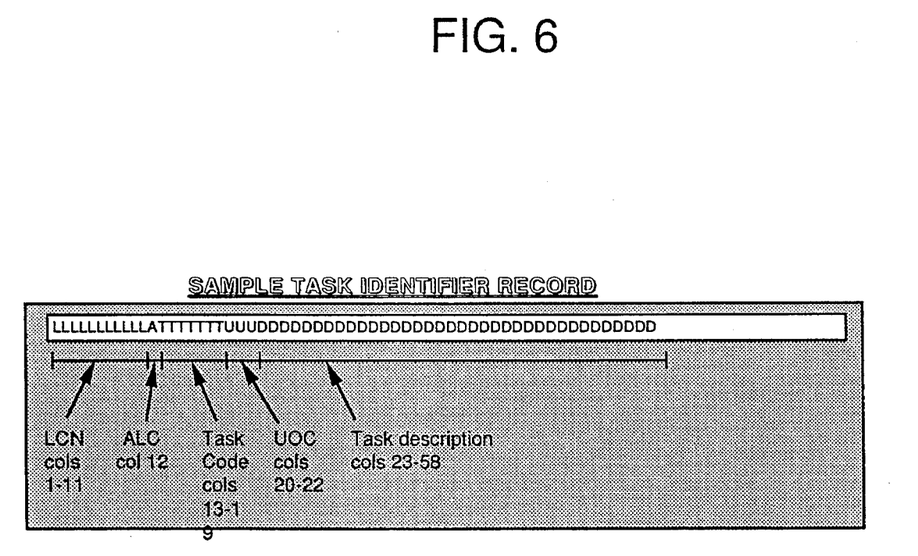
FIG. 6 illustrates the format of the task identifier record of the task table of FIG. 3 in further detail.

The task identifier fields comprising the task identifier record are used to identify which tasks the Parser program extracts from the database. Task identifier records are processed in the order in which they appear in the task table. Each task identifier record follows the same format, wherein columns 1–11 are reserved for the LSA Control Number (LCN). The LCN is a code that represents a functional or hardware generation breakdown/disassembly sequence of system/equipment hardware, including special equipment training equipment and installation (connecting hardware). Column 12 is reserved for the alternate logistics control number, the "ALC" number, a code used to allow documentation of multiple models of a system/equipment, or alternate design considerations of an item using the same LCN breakdown. Columns 13–19 are reserved for the task code, a data chain of six separate subfields which uniquely identify each operator/maintenance task associated with particular items under analysis. The first five subfields provide information relative to the performance of the task itself. The sixth subfield is a task sequence code provided to differentiate tasks with identical entries in the first five subfields. The individual subfields that comprise the task code are described as follows:

a. First subfield is "Task Code." It is a code that denotes a specific maintenance, operator, or supporting functions necessary to the operation and maintenance of an item.

b. Second subfield is "Task Interval Code." It is a code that identifies the scheduled or unscheduled timing of the task occurrence.

c. Third subfield is "Operations/Maintenance Level." It is a code that is assigned to indicate the maintenance levels authorized to perform the required maintenance function.

d. Fourth subfield is "Service Designator Code." It is a code identifying the military service or non-military major governmental agency having jurisdiction over, or executive management responsibility for, the acquisition.

e. Fifth subfield is "Operability Code." It is a code used to indicate the operational status and mission readiness of the team during the maintenance task.

f. Sixth subfield is "Task Sequence Code." It is a two position code assigned to each task. If the combination of the previous task code fields (task function, task interval, service designator, operations/maintenance level, and operability code) are unique, the entry will be "AA." If the first five fields are duplicated within an LCN/ALC combination, the follow-on task sequence code will be "AB" through "99" to differentiate the tasks.

Columns 20–22 are reserved for the "usable on code" (UOC), a code that indicates the configuration of a system/equipment on which the item under analysis is used. The UOC represent only one configuration/model of equipment. It is a one, two, or three character alphanumeric entry with guidance for UOC assignment provided by the requiring authority (Army, Navy, Air Force, Marine Corps, DoD, etc.). When an item is applicable to multiple equipment configurations, multiple UOCs representing each configuration are assigned to the item. Columns 23–80 are reserved for the description of the task. In this embodiment, this field is for use of the responsible support engineer only, and does not appear in the Parser reports. The LCN, ALC and task code (TC) define the data required for the particular task which is to be extracted from the database. The LCN/ALC/TC combination will uniquely identify the proper data. Note that the LCN is a code that represents a functional or hardware generation breakdown/disassembly sequence of system/equipment hardware, including special equipment, training equipment, and installation (connecting hardware), and, as such, can have multiple ALCs. Also, an ALC is a code used to allow documentation of multiple models of a system/equipment, or alternate design considerations of an item using the same LCN breakdown, and, as such, can have multiple tasks (i.e., Task Codes). Task Codes are a data chain of subfields which uniquely identify each operator/maintenance task associated with particular items under analysis.

FIG. 6 illustrates the format of the task identifier record of the task tables in further detail.

Figure 7:
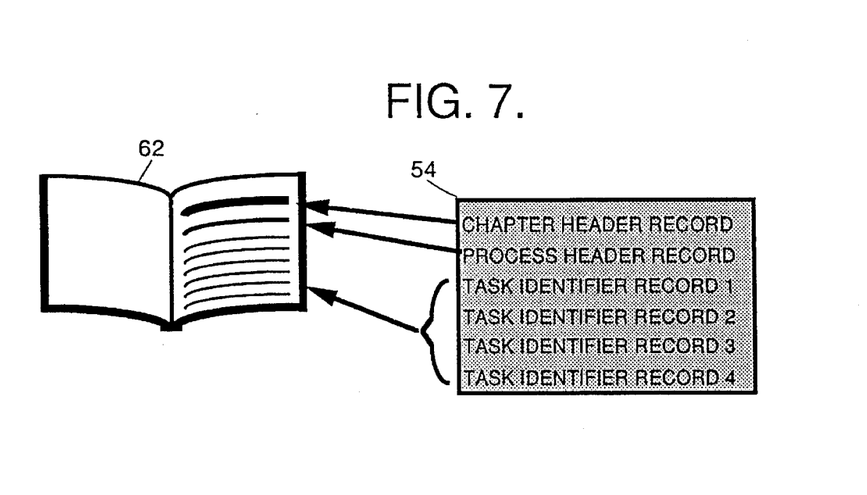
FIG. 7 illustrates how a task table relates to a publication.

FIG. 7 illustrates how a task table relates to a publication 62.

Figure 8A:
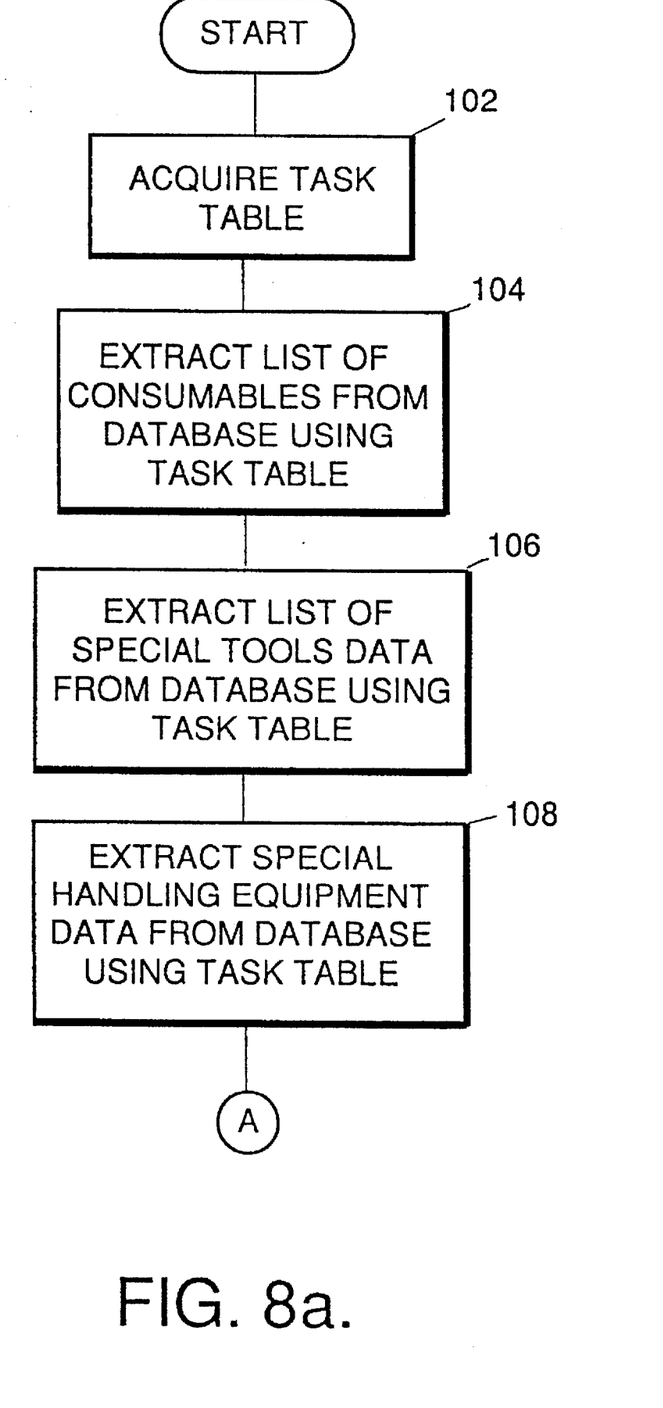
FIGS. 8A and 8B illustrate an exemplary embodiment of the automated publication process of the present invention.
Figure 8B:
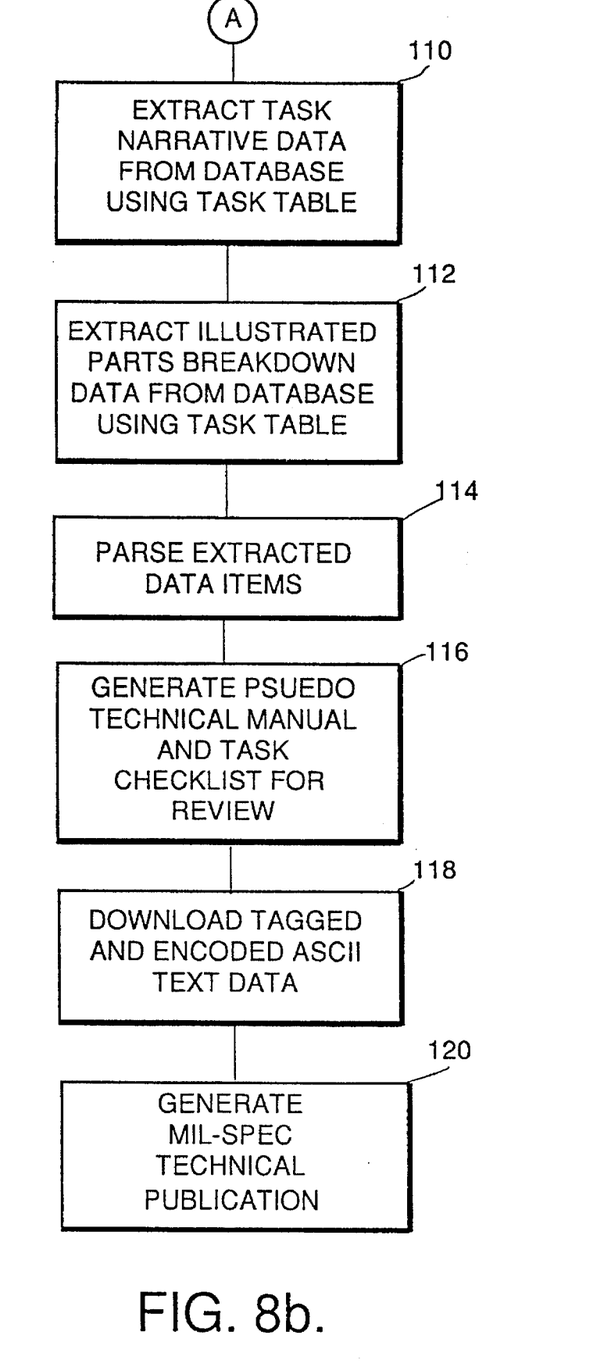

FIGS. 8A and 8B illustrates in further detail an exemplary embodiment of the automated publication process of the present invention. At step 102, the unit of work selected by the user is acquired in the form of the task table. Next, at step 104, the list of consumables is extracted from the database using the task table. At step 106, the list of special tools data is extracted from the database using the task table. Special handling equipment data is extracted from the database using the task table (step 108). Task narrative data and illustrated parts breakdown data are extracted from the database using the task table (steps 110 and 112). At this point, the extracted data is parsed, or processed by the Parser program (step 114). The Parser program generates the pseudo technical manual and task checklist for review (step 116). The tagged and encoded ASCII text data is downloaded into a disk file for further processing by a personal computer workstation (step 118). The work station processes the disk file to generate the MIL-STD technical publication (step 120).

FIGS. 9A–9F depict operational flow diagrams illustrative of the process steps of FIGS. 8A and 8B. Step 102 is depicted within phantom line 102 of FIG. 9A. A selected unit of work is loaded from the technical publications task library 70, which includes in this embodiment a library of pre-generated task tables, into the task table 74 using the system copy utility 72, creating the exemplary task table 75.

Figure 9A:
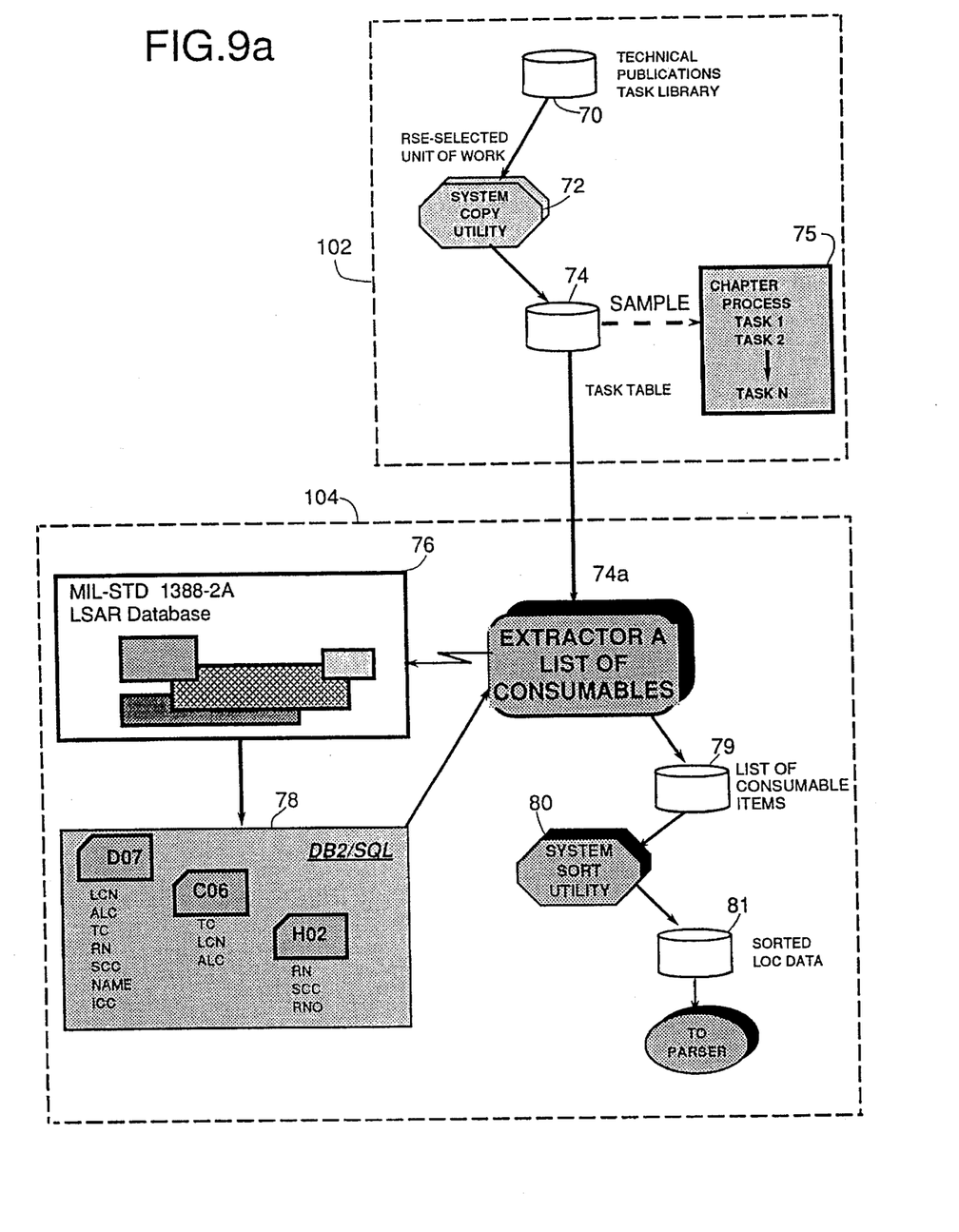
FIGS. 9A–9F illustrates the process of FIGS. 8A and 8B in further detail.

Step 104 of FIG. 8A is depicted within the phantom line 104 of FIG. 9A. Extractor process 74A is employed to extract the List of Consumable (LOC) items 79 from the LSAR database 76. As illustrated in FIG. 9A, a database complying with MIL-STD 1833-2A will include several "card images" or tables 78, including the tables labeled "D07," "C06" and "H02." The data required at this point in the process resides in three different tables identified as 'D07', 'C06', and 'H02'. These are required per MIL-STD-1388-2A. Each table includes a number of records. A database is made up of tables. Tables are made up of rows and columns. Therefore, database tables are two dimensional. Rows in a table are called records and columns in a table are a collection of data with similar characteristics. The intersection of a row and a column is called a field. Thus, the "D07" tables includes the fields labeled "LCN," "ALC," "TC," "RN," "SCC," "NAME," and "ICC." The "C06" table for this example includes the "TC," "LCN," and "ACL" fields. The "H02" table includes the fields "RN," "SCC," and "RND." The data within a given record is extracted by use of its "key." A "key" is a unique identifier within a set of data elements. It is one or more characters used to identify the record and establish the order of the record within a file. The system sort utility 80 is used to sort the LOC data to provide a set of sorted LOC data 81, which is sent to the Parser program.

Figure 10:
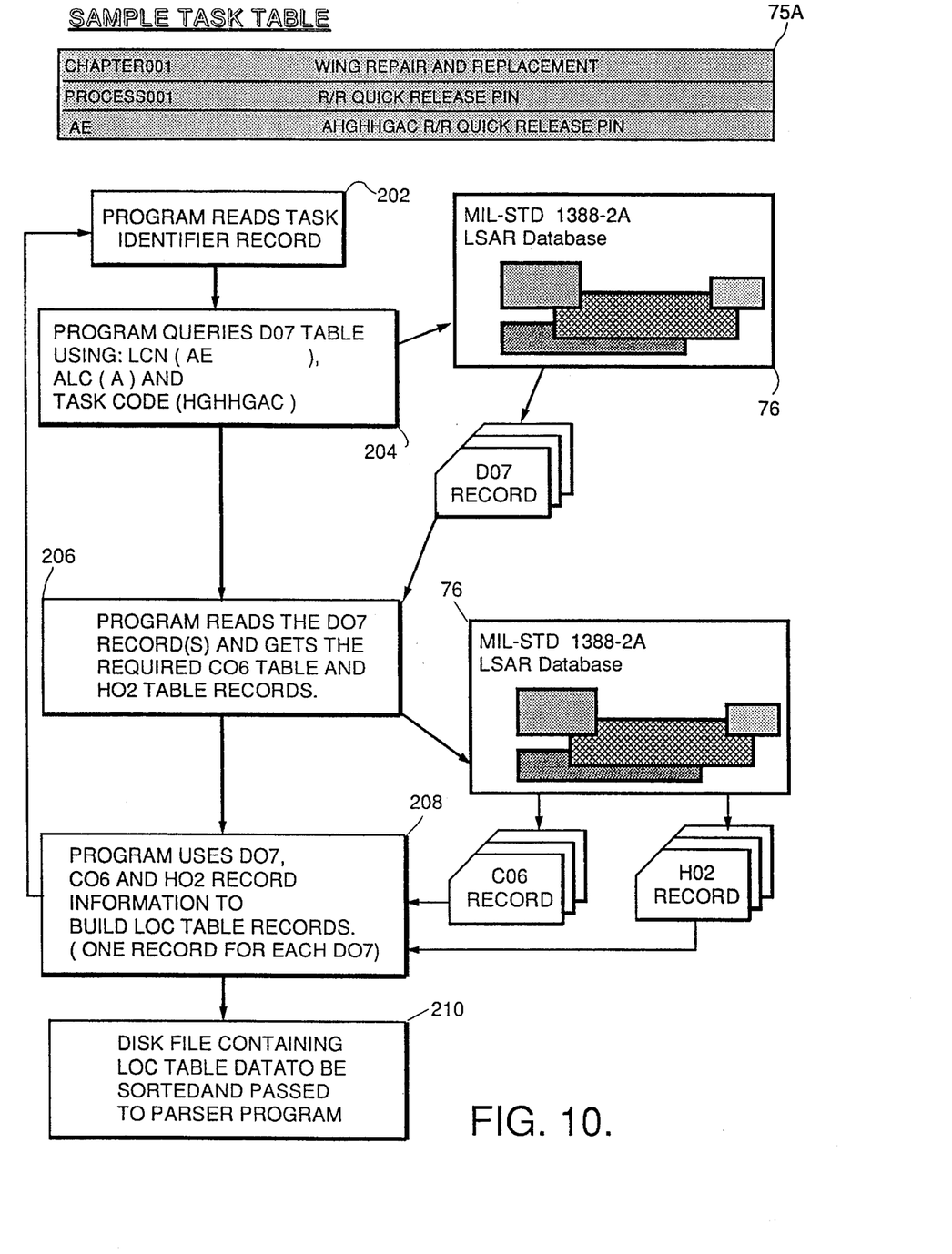
FIG. 10 illustrates step 104 of FIG. 9A in further detail.

FIG. 10 illustrates step 104 (FIG. 9A) in further detail for an exemplary task table 75A. The LOC is constructed in this embodiment by using the LCN, ALC and TC as a key and accessing the C06 table, searching for the record matching the search key. At step 202 the extractor program reads the task identifier records in the task table 75A. At step 204 the List of Consumable (LOC) extractor program uses the LCN, ALC, and TASK CODE fields from a Task Identifier Record to select consumable items from the D07 table. In this example the LCN code field is "AE" the ALC code field is "A" and the Task Code field is "HGHHGAC" The D07 table contains information about support and supply equipment necessary to accomplish the specific task. The LOC extractor program examines the ITEM CATEGORY CODE (ICC) in the D07 table for each table record that matches the LCN, ALC, and TASK CODE. Consumable items are coded with a 'Q' in the ICC. For each consumable item found, the LOC extractor program collects additional information from the C06 table and H02 table (step 206).

The LCN, ALC and TASK CODE fields are also used to find the corresponding C06 table entry. The C06 table contains operational and maintenance task requirements data. The TASK IDENTIFICATION field of the C06 contains a short narrative description of the task.

The H02 table is queried using the Reference Number (RN) and SIGNIFICANT CHARACTER CODE (SCC) from the D07 record to select the REFERENCE NUMBER OVERFLOW (RF0). The RFO field contains that portion of the RN that exceeds 16 characters.

The LOC extractor program now has all the information needed to write a record for an item used in the List of Consumables Table. Records are written for each consumable item found in the D07 table that match the LCN, ALC, and TASK CODE (step 208). The program repeats this procedure for each Task Identifier Record in the Task Table. Finally, at step 210, a disk file is constructed which contains the LOC table data to be sorted and passed to the Parser program.

Figure 9B:
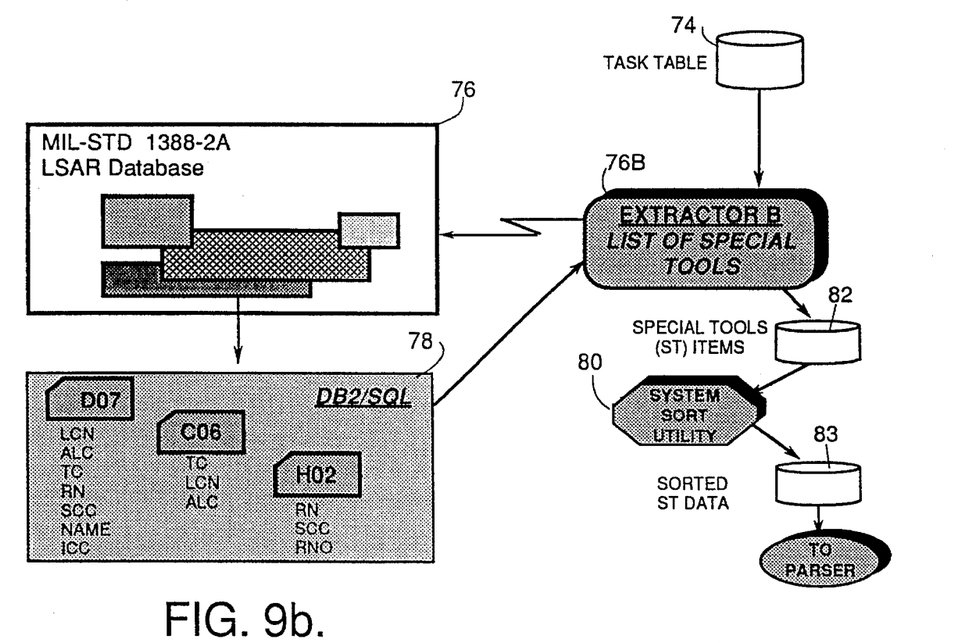

FIG. 9B illustrates the step 106 of FIG. 8A in further detail. Here, the list of special tools is extracted by extraction process 76B from the database 76 using the task table. The tables are D07, C06, and H02. The fields for D07 are: LCN, ALC, TC, RN, SCC, NAME, ICC. Fields for C06 are: TC, LCN, ALC. Fields for H02 are: RN, SCC, RNO. The special tool items returned from the database are sorted by the sort utility 80, to provide a file of sorted special tool data.

Figure 9C:
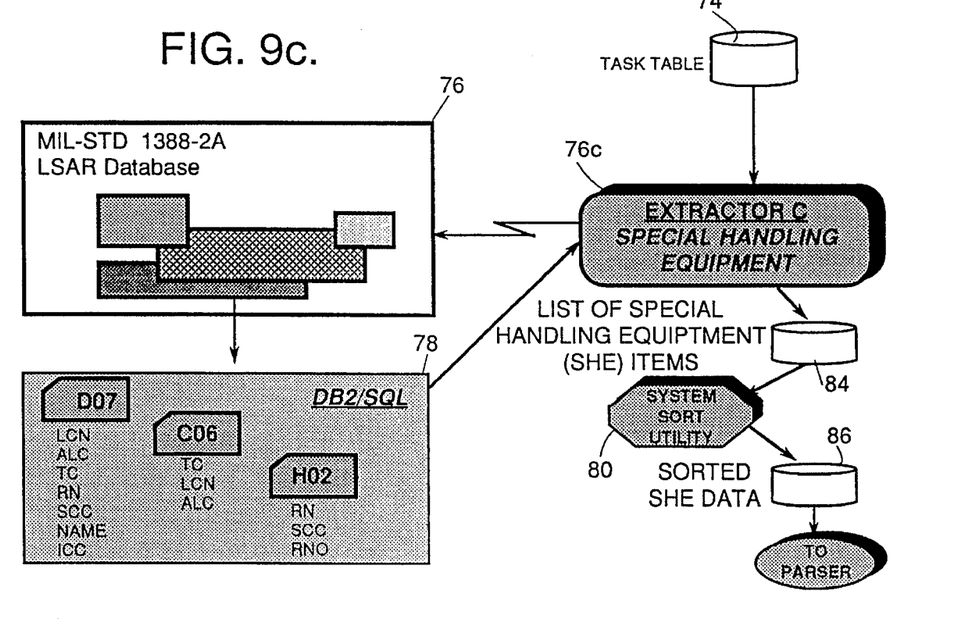

FIG. 9C illustrates step 108 of FIG. 8A in further detail. The list of special handling equipment required for the selected task is extracted from the database 76 by extractor process 76C, using the task table 74. This extraction process uses the same tables as extraction process 76C. The difference is the ICC field. The ICC field is Item Category Code, a code which identifies a type of item and indicates categories into which support and test equipment, spare, repair parts, etc. may be divided. The list of special handling equipment returned from the database is sorted by sort utility 80, to provide a file of sorted special handling equipment.

Figure 9D:
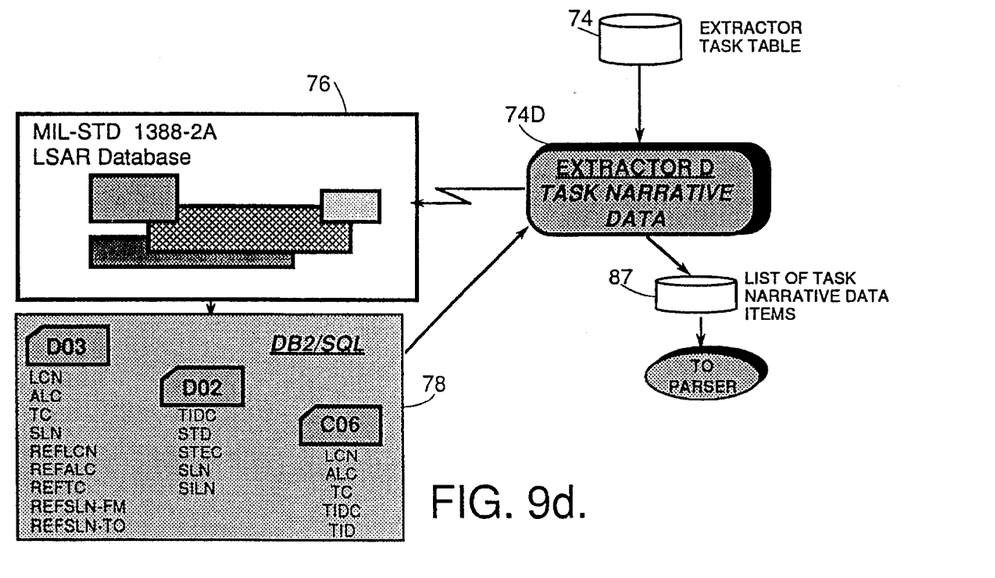

FIG. 9D illustrates step 110 of FIG. 8B in further detail. The task narrative data required for the selected task is extracted from the database 76 by extractor process 76D, using the task table 74. The tables are D03, D02, and C06. Fields for D03 are: LCN, ALC, TC, SLN, REFLCN, REFALC, REFTC, REFSLN-FM, REFSLN-TO. Fields for D02 are: TIDC, STD, STEC, SLN, SILN. Fields for C06 are: LCN, ALC, TC, TIDC, TID. The list of task narrative data is provided in a file 86, to the Parser process.

Figure 9E:
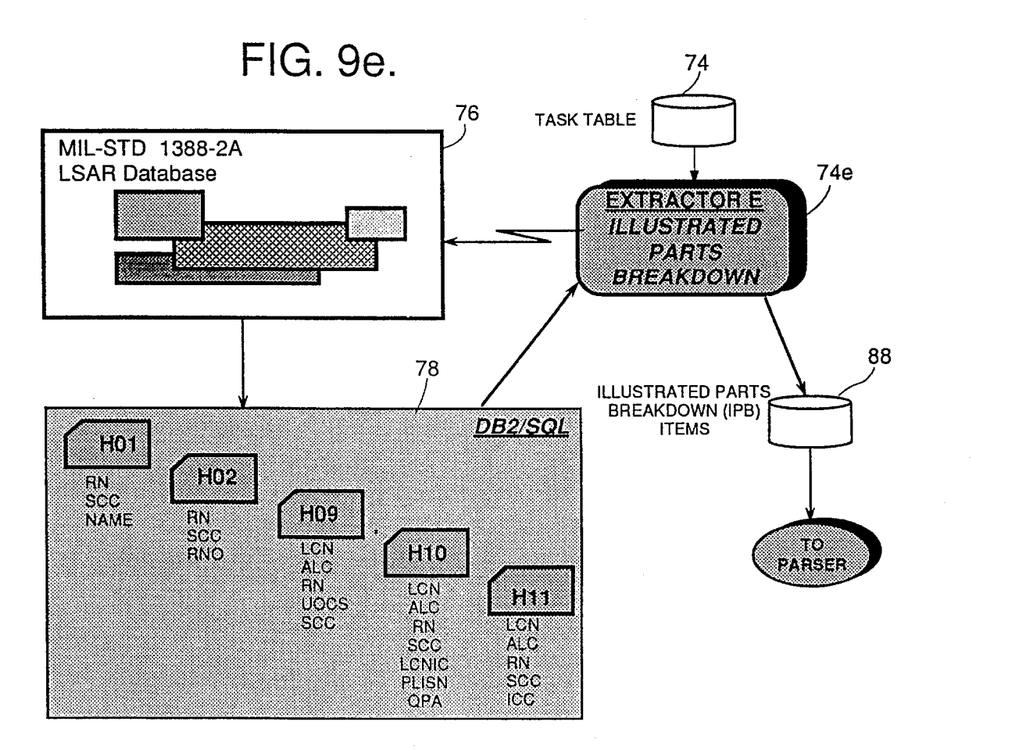

FIG. 9E illustrates step 112 of FIG. 8B in further detail. The illustrated parts breakdown for the selected task is extracted from the database 76 by extractor process 74E, using the task table 74. The tables are H01, H02, H09, H10, and H11. Fields for H01 are: RN, SCC, NAME. Fields for H02 are: RN, SCC, RNO. Fields for H10 are: LCN, ALC, RN, SCC, LCNIC, PLISN, QPA. Fields for H11 are: LCN, ALC, RN, SCC, ICC. The illustrated parts breakdown data extracted from the database is provided in a file 88, to the Parser program.

Figure 9F:
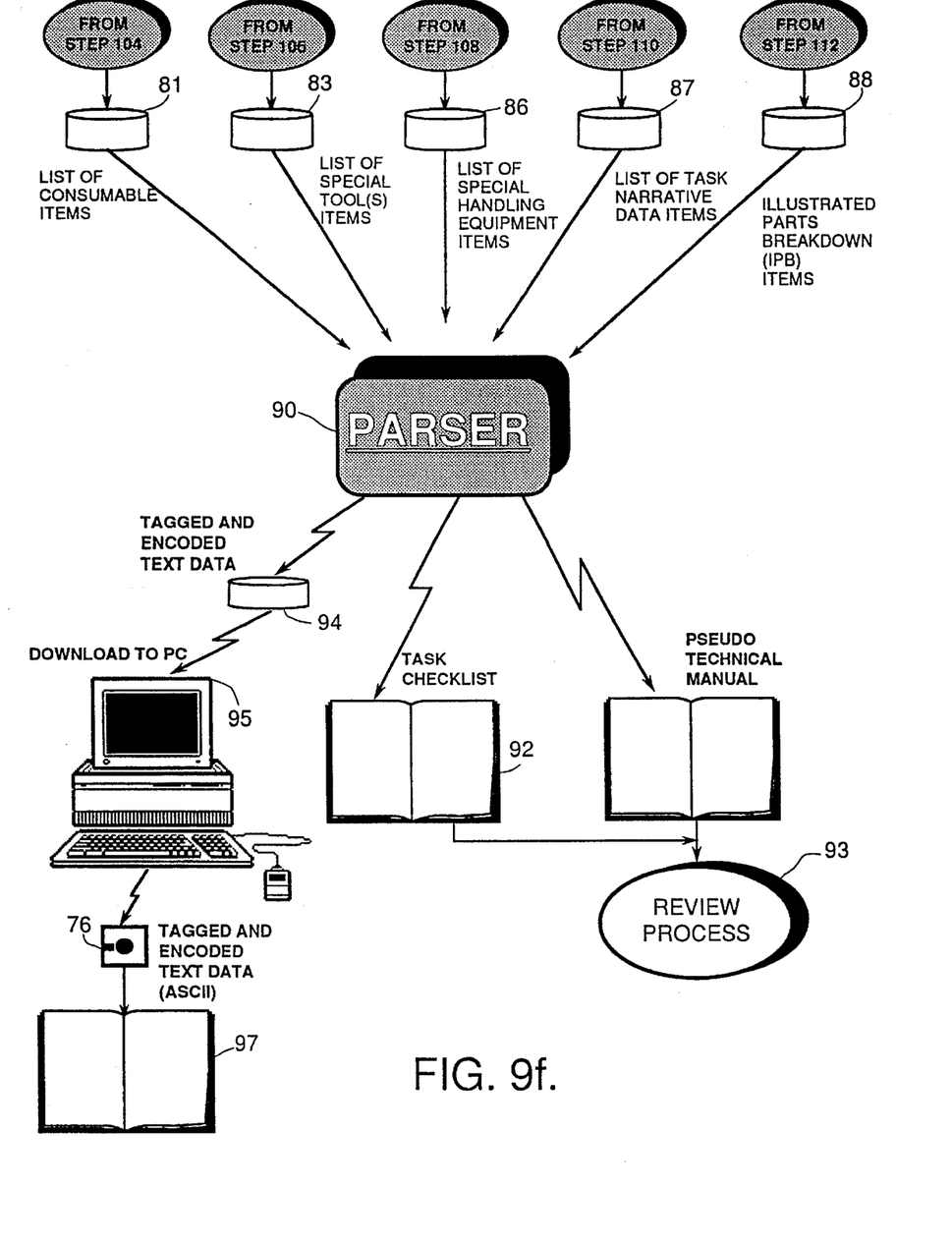

FIG. 9F illustrates steps 114–120 of FIG. 8B in further detail. The data files resulting from steps 104–112 are parsed by the Parser process 90. The Parser process 90 parses the data in files 81, 83 and 86–88 to generate a task checklist 92, a pseudo technical manual 91, and a file 94 of tagged and encoded text data for the technical publication. The Parser program uses input from the five extractor programs, not from the relational database.

A. List of Consumable items (81) are extracted from the database using a COBOL program (74A). The program adds a List of Consumable header record to this file. The file is then sorted (80) prior to being processed by the Parser program.

B. List of Special Tools items (83) are extracted from the database using a COBOL program (76B). The program adds a List of Special Tools header record to this file. This file is then sorted (80) prior to being processed by the Parser program.

C. List of Special Handling Equipment items (86) are extracted from the database using a COBOL program (76C). The program adds a list of Special Handling Equipment header record to this file. This file is then sorted (80) prior to being processed by the Parser program.

D. List of Narrative items (87) are extracted from the database using a COBOL program (74D). The program adds specific Task Narrative header records for each task being processed. This file is not sorted prior to being processed by the Parser program.

E. Illustrated Parts Breakdown items (88) are extracted from the database using a COBOL program (74E). The program adds an Illustrated Parts Breakdown header record to this file. This file is sorted internally as the data is extracted.

All five of the input files use the same record length and are processed in the order listed. The header records identify to the Parser program exactly which input file is to be processed.

When the Parser program encounters a header record, it sets program logic flags which identify specific subroutines needed to process that file. These program logic flags stay in effect until the next header record is encountered. A program logic flag is simply an internal storage location used by the program to hold specific information. In the case of the Parser program, a one byte (character) field is set to "C" when the List of Consumable header record is encountered. This field is checked by the program to determine which of five report headings to print, which line and page counters to update and which input buffer to use. For example, the List of Consumable report headings will be printed on the Pseudo Technical manual when the previously mentioned field is set to "C."

The Parser program produces three distinct output files. The processing requirements for each of these files are unique and are summarized below:

A. Task Checklist. This is a report produced by the Parser which uses only the Task Narrative input file as input. Within the Task Narrative file are specific lines of information which summarize specific subtasks within the task. These lines of information are selected and written to a data set which is formatted as a report. Standard page headings and page overflow logic are used. The report groups these lines of information by task and presents the tasks in the order they appear in the task table (74).

B. Pseudo Technical Manual. This is a report produced by the Parser program which uses all five input files. The presentation of the information is such that it resembles technical manuals currently being delivered to the customer. The purpose of this report is to provide a document that contains all the required technical information to a variety of users. Responsible Support Engineers (RSEs), Quality Assurance personnel, Technical Editors and the Customer all have input during the development of a Technical Publication. The Pseudo Technical Manual is, in effect, a manuscript of the Technical Publication which is automatically generated by the Parser program and is acceptable to all users. Corrections/changes can be marked on the manuscript and submitted back to the RSE for inclusion into the database, then a new version of the Pseudo Technical Manual can be generated. Only when all users are satisfied will the time and expense of generating a MIL-STD technical manual (see output C) be incurred.

The Pseudo Technical Manual consists of the following reports:

1. List of Consumables

2. List of Special Tools

3. List of Special Handling Equipment

4. Task Narrative

5. Illustrated Parts Breakdown.

C. Tagged and Encoded Test Data. Also known as "Machine Readable Technical Manual," this output file contains the same information as the Pseudo Technical Manual but in a different format. This file is used at a personal computer workstation to generate a MIL-STD technical manual. Two basic needs must be satisfied for this process to work. The data must be in a form acceptable for use by the workstation word processing software and key informational messages must be provided to operators of the workstation. Informational messages are used to tell the operator what data is to be processed. The input data formats of the List of Consumable Table, List of Special Tools Table, and List of Special Handling Equipment Tale are identical. Without an informational message the operator would not know which report headings to use for the Technical Manual. Additionally, informational messages herald the beginning of the narrative data, IPB Table data and Task Code breaks within the narrative. Additionally, the Parser program encodes the following symbols:

1. Tilde (~)—identifies location for a text carriage return.

2. Backslash (\)—identifies location for a field tab.

3. Double Left Brace ({{)—identifies location for auto paragraph numbering.

These symbols are converted by special macros to automatically insert the specified code. Using these macros saves the word processing operator from having to enter these codes manually.

The Parser program also converts redundant spaces in the file to nulls. This saves time when the file is downloaded to the PC.

Information for the Tagged and Encoded Test Data is used to generate the following parts of a MIL-STD Technical Manual:

1. List of Consumables

2. List of Special Tools

3. List of Special Handling Equipment

4. Task Narrative

5. Illustrated Parts Breakdown.

The task checklist 92 and the pseudo technical manual 91 are used in the optional manual review process 93, wherein the responsible support engineer, quality assurance and the technical editor can review the data and make any desired changes. The formal technical manual produced for delivery is rigidly formatted per the contractually required format specifications (e.g., MIL-M-38784, MIL-M-927). The pseudo technical manual contains all of the data that will appear in the formal technical manual, but the style and format of presentation is variable and not rigidly controlled.

Once the optional review process 93 has been completed, the file 94 is downloaded to a personal computing workstation 95. A conventional word processing program processes the file, relying on a set of program macros to convert the special symbols and characters contained within the file 94 to document format instructions. In one exemplary embodiment, the following macro instructions are used:

ALT1: Deletes leading spaces from ~ (tilde) characters

ALT2: Deletes trailing spaces from \ (backslash) characters

ALT3: Deletes trailing spaces from ~ (tilde) characters

ALT4: Replace ~ (tilde) characters with CR (carriage returns)

Replace \ (backslash) characters with TAB (tabs)

ALT6: Replace {{ (double brackets) with auto paragraph numbering

ALT7: Replace NOTE with (CENTER) NOTE, CAUTION with (CENTER) CAUTION, WARNING with (CENTER) WARNING ALT;: 80 Column Underline ALT=: 130 Column Underline The MIL-SPEC technical publication 97 is now ready for publishing.

Following is an exemplary technical publication document in MIL-SPEC 38784B format.

Figure 11:
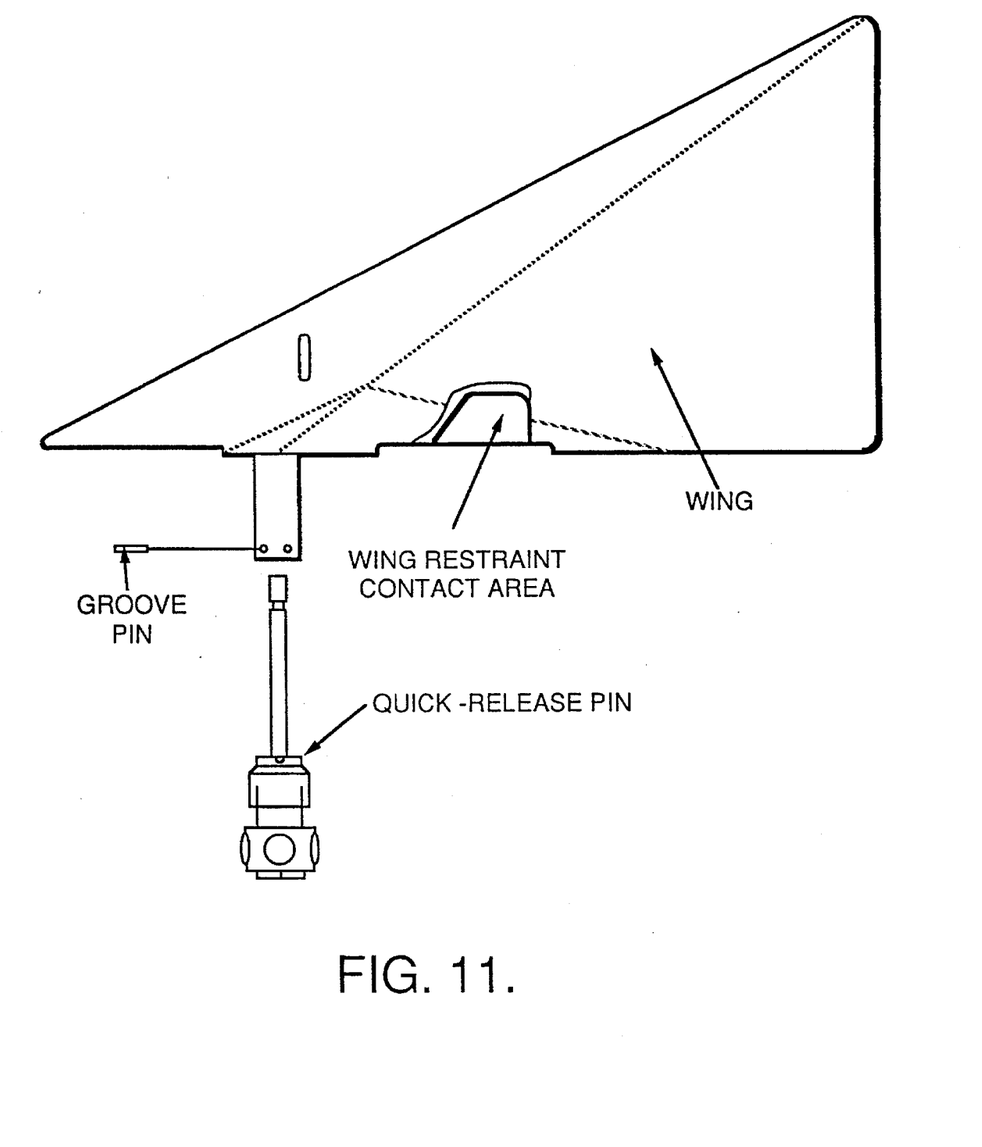
FIG. 11 is an exemplary illustrated parts breakdown diagram for an exemplary technical publication generated by the method.

| APPENDIX A | | | | |
|---|---|---|---|---|
| x-x. | R/R QUICK RELEASE PIN | | | NOTE |
| a. | Remove grooved pin from wing shaft (see FIG. 11). | | | Install quick release pin while sealing compound is wet. Sealing compound requires 24 hours at room temperature to cure. |
| b. | Using 9/16-inch, 6-point socket, remove quick release pin from wing. | | | |
| c. | Inspect inside of wing shaft for corrosion. | | e. | Apply sealing compound to threads of quick release pin and install into wing. |
| d. | Inspect quick release pin for absence of lubricant. Apply lubricant to quick release pin from color band to threads IAW MIL-L-23398, Type 2. | | f. | Torque quick release pin to 190 ±10 in/lb. |
| | | | g. | Install grooved pin (MS35675-2) to secure quick release pin to wing. |

TABLE X-X

Parts Breakdown

| FIG and index | Part number | CAGE | Description 1 2 3 4 5 6 7 | Units per assy | Use on code | SMR code |
|---|---|---|---|---|---|---|
| | 7005250 | 82577 | Wing, guided missile | 1 | G,A3, | PAFZZN |
| | G475902 | 49956 | Wing, guided missile | 1 | G,A3,A4,A5,A6, | PAFZZN |
| | 657834-1 | 82577 | Pin, quick release | 1 | G,A3, | PAFZZN |
| | 657834-2 | 82577 | Pin, quick release | 1 | G,A3,A4,A5,A6, | PAFZZN |
| | 3824787 | 82577 | Marker, ident | 1 | G,BL,A1,A2,A3,A4,A5,A6, | MDF |
| | 3824788-2 | 82577 | Marker, ident | 2 | G,BL,A1,A2,A3,A4,A5,A6, | MDF |
| | MS35675-2 | 96906 | Pin, grooved, hdls | 1 | G,BL,A3,A4,A5,A6, | PAFZZN |

TABLE Y-Y

List of Consumables

| Common name | Specification or part number | Application |
|---|---|---|
| Sealing compound | MIL-S-46163 TY1GRK | R/R pin, quick release |

Following is the same exemplary technical publication, but in MIL SPEC 81927A format.

INTRODUCTION GUIDED MISSLE XXX-XXX

TABLE Y-Y

List of Consumables

| Common name | Specification or part number | Application |
|---|---|---|
| Sealing compound | MIL-S-46163 TY1GRK | R/R pin, quick release |

R/R QUICK RELEASE PIN
GUIDED MISSILE XXX-XXX

NOTE a. Remove grooved pin from wing shaft (see FIG. 11).
b. Using 9/16-inch, 6-point socket, remove quick release pin from wing.
c. Inspect inside of wing shaft for corrosion.
d. Inspect quick release pin for absence of lubricant. Apply lubricant to quick release pin from color band to threads IAW MIL-L-23398, Type 2.

Install quick release pin while sealing compound is wet. Sealing compound requires 24 hours at room temperature to cure.

e. Apply sealing compound to threads of quick release pin and install into wing.
f. Torque quick release pin to 190 ±10 in/lb.
g. Install grooved pin (MS35675-2) to secure quick release pin to wing.

| | | | | PARTS BREAKDOWN GUIDED MISSILE XXX-XXX | | | |
|---|---|---|---|---|---|---|---|
| FIG and index | Part number | CAGE | Description 1 2 3 4 5 6 7 | | Units per assy | Use on code | SMR code |
| | 7005250 | 82577 | Wing, guided missile | | 1 | G,A3, | PAFZZN |
| | G475902 | 49956 | Wing, guided missile | | 1 | G,A3,A4,A5,A6, | PAFZZN |
| | 657834-1 | 82577 | Pin, quick release | | 1 | G,A3, | PAFZZN |
| | 657834-2 | 82577 | Pin, quick release | | 1 | G,A3,A4,A5,A6, | PAFZZN |
| | 3824787 | 82577 | Marker, ident | | 1 | G,BL,A1,A2,A3,A4,A5,A6, | MDF |
| | 3824788-2 | 82577 | Marker, ident | | 2 | G,BL,A1,A2,A3,A4,A5,A6, | MDF |
| | MS35675-2 | 96906 | Pin, grooved, hdls | | 1 | G,BL,A3,A4,A5,A6, | PAFZZN |

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for automatically generating a technical publication descriptive of a work task or series of work tasks involving the operation or maintenance of particular hardware, and complying with a predetermined standardized document format wherein a set of instructions and pertinent information necessary for performing said task or series of tasks is included in the technical publication, the method further comprising a sequence of the following steps:

providing access to a relational database which does not include, define or have residing or embedded therein document structure data defining a document structure of the technical publication, said database having stored therein for each said task one or more data sets, each said data set being identified with a predetermined unique identification name and specifying content information required in the performance of said task while not having any document format data embedded therein;

constructing externally to said database a task table which contains a list of data sets, said task table for identifying the data to be extracted from said database for a particular chapter of said document, said task table comprising a listing of the identification names of the data sets to be extracted from said database;

using said task table externally to said database to extract said data sets from said database, and for each data set, defining an input file including a parser header record identifying the particular type of data comprising said data set;

parsing said input files external to said database to create a parser output file containing the content data necessary to publish said technical publication, said parsing step comprising reading each input file, setting program logic flags when an input file parser header record is encountered, said logic flags identifying particular report headings to be printed in said technical publication, and encoding within said parser output file symbols representing document format instructions for said predetermined standardized document format; and processing said parser output file externally to said database to convert said encoding symbols into said document format instructions and publish said technical publication with said report headings and in accordance with said document format instructions to comply with said predetermined standardized document format, said publication setting forth information extracted from said relational database which is necessary to the performance of said task.

2. The method of claim 1 wherein said task table comprises a chapter header record which defines the chapter number and name, a process header record-which assigns beginning paragraph numbers within a chapter, and at least one task identifier record which identifies which data sets are to be extracted from said database.

3. The method of claim 2 wherein said chapter header record comprises a record having a predetermined number of columns, wherein a first data field at a first set of said columns designates a first predetermined keyword, a second data field at a second set of said columns designates the chapter number to be assigned to the chapter to be generated, and a third data field at a third set of said columns designates the name of the chapter as it is to be published in said publication.

4. The method of claim 2 wherein said process header record comprises a record having a predetermined number of columns, wherein a first data field at a first set of said columns designates a second predetermined keyword, and a second data field at a second set of said columns designates the starting paragraph number for the tasks in said task table.

5. The method of claim 2 wherein said task identifier record comprises a record having a predetermined number of columns, wherein a first data field at a first set of columns designates a first task code, and a second data field at a second set of columns designates a second task code, said first and second task codes comprising said identification names.

6. The method of claim 1 wherein said task table comprises a plurality of task identifier records, and wherein said task identifier records are processed in the order in which they appear in said task identifier record in said processing step.

7. The method of claim 1 wherein said database is a relational database which complies with MIL-STD 1388-2A.

8. The method of claim 1 wherein said technical publication complies with a predetermined military publication standard.

9. The method of claim 1 wherein said data sets extracted from said database comprise a data set defining a list of consumables required for said task.

10. The method of claim 1 wherein said data sets extracted from said database comprise a data set defining a list of special tools required for said task.

11. The method of claim 1 wherein said data sets extracted from said database comprise a data set defining special handling equipment required for said task.

12. The method of claim 1 wherein said data sets extracted from said database comprise a data set defining task narrative describing said task.

13. The method of claim 1 wherein said data sets extracted from said database comprise a data set defining illustrated parts involved in said task.

14. The method of claim 1 wherein said parsing step further includes the step of providing a pseudo technical publication report file which comprises data from said parser input files representing said content information but which does not rigidly comply with said standardized document format, said report file for use as a preliminary review manuscript of said technical publication.

15. The method of claim 1 wherein said steps of providing access to said database, using said task table to extract data sets, and parsing said input files are conducted within a mainframe computer environment, and said step of using said parser output file to publish said technical publication is conducted on a computer workstation comprising a personal computer.

16. A method for automatically generating a technical publication descriptive of a work task or series of work tasks involving the operation or maintenance of particular hardware, and complying with a predetermined standardized document format, wherein a set of instructions and pertinent information necessary for performing said task or series of tasks is included in the technical publication in accordance with the standardized document format, the method comprising a sequence of the following steps:

providing access to a relational database, which database does not include, define or have residing or embedded therein document structure data defining a document structure of the technical publication, said database having stored therein for each said task one or more data sets in rows and columns of one or more tables comprising said database, each said data set being identified with a predetermined unique identification name and specifying content information required in the performance of said task while not having any document format data embedded therein;

constructing externally to said database a task table which contains a list of data sets, said task table for identifying the data to be extracted from said database for a particular chapter of said document, said task table comprising a listing of the identification names of the data sets to be extracted from said database, said task table defining the particular data to be incorporated into said technical publication from said database, including a list of consumables required for said task, a list of special tools required for said task, a list of special handling equipment required for said task, and a list defining task narrative data, and illustrated parts breakdown data;

using said task table externally to said database to extract said data sets from said database and provide parser input files corresponding to said data sets, each input file comprising header records specifying the file identity;

parsing said data sets externally to said database to create a machine readable technical manual file containing the content data specific to said task necessary to publish said technical publication, said parsing step comprising setting informational messages in said technical manual file identifying particular report headings to appear in the technical publication and format symbols representing document format instructions for said predetermined standardized document format; and processing said technical manual file externally to said database to convert said encoding symbols into said document format instructions and publish said technical publication with said report headings in accordance with said document format instructions to comply with a rigid format specified by said standardized document format.

17. The method of claim 16 wherein said task table comprises a chapter header record which defines the chapter number and name, a process header record which assigns beginning paragraph numbers within a chapter, and at least one task identifier record which identifies which data sets are to be extracted from said database.

18. The method of claim 17 wherein said chapter header record comprises a record having a predetermined number of columns, wherein a first data field at a first set of said columns designates a first predetermined keyword, a second data field at a second set of said columns designates the chapter number to be assigned to the chapter to be generated, and a third data field at a third set of said columns designates the name of the chapter as it is to be published in said publication.

19. The method of claim 17 wherein said process header record comprises a record having a predetermined number of columns, wherein a first data field at a first set of said columns designates a second predetermined keyword, and a second data field at a second set of said columns designates the starting paragraph number for the tasks in said task table.

20. The method of claim 17 wherein said task identifier record comprises a record having a predetermined number of columns, wherein a first data field at a first set of columns designates a first task code, and a second data field at a second set of columns designates a second task code, said first and second task codes comprising said identification names.

21. The method of claim 16 wherein said task table comprises a plurality of task identifier records, and wherein said task identifier records are processed in the order in which they appear in said task identifier record in said processing step.

22. The method of claim 16 wherein said database is a relational database which complies with MIL-STD 1388-2A.

23. The method of claim 16 wherein said technical publication complies with a predetermined military publication standard.

24. The method of claim 16 wherein said parsing step further includes creating a task checklist report file, using only said task narrative list data.

25. The method of claim 16 wherein said parsing step further includes the step of providing a pseudo technical publication report file which comprises data from said parser input files but which does not rigidly comply with said standardized document format, said report file for use as a preliminary review manuscript of said technical publication.

26. The method of claim 16 wherein said steps of providing access to said database, using said task table to extract data sets, and parsing said input files is conducted within a mainframe computer environment, and said step of using said parser output file to publish said technical publication is conducted on a computer workstation comprising a personal computer.

* * * * *